United States Patent Office 3,049,561
Patented Aug. 14, 1962

---

3,049,561
PROCESS FOR HYDROXYNAPHTHALENE-ALKANOIC ACIDS
William B. Hardy, Bound Brook, Frank M. Furman, Somerset, and Delton W. Hein, Basking Ridge, N.J., assignors to American Cyanamid Company, New York, N.Y., a corporation of Maine
No Drawing. Filed July 27, 1959, Ser. No. 829,558
8 Claims. (Cl. 260—520)

This invention relates to a process for preparing hydroxynaphthalene alkanoic acids. More specifically, it relates to a process for producing hydroxynaphthyl alkanoic acids in which the naphthyl is on the α- or β-position of the acid chain which comprises heating a hydroxy substituted naphthalene in which there is a vacant alpha position next to a beta hydroxyl or a vacant beta position next to an alpha hydroxyl, with an α- or β-mercaptoalkanoic acid to above 80° C. under alkaline, substantially non-aqueous, condition.

Heretofore there has been no direct and simple method of preparing hydroxynaphthaleneacetic or propionic acids in good yield. Heretofore 1-hydroxy-2-naphthalenepropionic or acetic acids have not been known as compounds. These α-hydroxy compounds, now prepared by the method of our invention, are new coupling components as well as intermediates for various compounds usable as plant growth hormones. 2-methoxy-1-naphthaleneacetic acid has heretofore been known as a plant growth hormone and this can be readily prepared by alkylation of 2-hydroxy-1-naphthaleneacetic acid, as prepared by the process of our invention. Heretofore, this plant growth hormone has been prepared by methods involving multiple steps and low yields.

It has been previously found that naphthols react with thioglycolic acid in the presence of strong acids to give replacement of the hydroxyl group by the thioglycolic acid group. We have now found that, in the presence of strong alkali, an entirely different and unexpected reaction takes place. In the presence of strong alkali, naphthols otherwise having only inert substituents react with thioglycolic acid and other α- or β-mercaptoalkanoic acids to give direct substitution in the adjacent free alpha or beta positions respectively by the acid grouping with the elimination of the sulfur. In the case of alpha hydroxyls, the only product positively identifiable is the o-derivative although it is probable that p-substitution also occurs if the para position is open. Thus, it is possible to introduce several such alkanoic acid moieties into the naphthalene ring, either by direct bis-substitution of α-naphthol or by the use of a dihydroxy naphthalene such as 2,6-dihydroxynaphthalene.

This is a most unexpected observation and, as pointed out above, a highly useful one, in that it affords a direct synthesis in good yields of compounds previously obtainable only by roundabout routes.

In the process of our invention, the naphthol and the mercaptoalkanoic acid are reacted under alkaline conditions in approximately equimolecular quantities. At most 10% excess of one or the other reagent is used. The alkaline conditions are provided by including a strong base. For optimum conditions it is recommended that one and a half moles of base be used since at least the first mole of base goes toward the neutralization of the mercaptoalkanoic acid used as a starting material. If the naphthol possesses acid substituents (carboxy e.g.) extra base is necessary to neutralize this, also. Of course, alternatively the mercaptoalkanoic acid can be added to the reaction mixture as the salt, in which case the base might be said to be already included in the reaction mixture. The effect of varying the amount of alkali on the reaction of beta-naphthol with thioglycolic acid can be shown in the following table.

| Moles 2-Naphthol | Moles Thioglycolic Acid | Total Moles NaOH | Yield of 2-Hydroxy-1-naphthaleneacetic acid, percent |
|---|---|---|---|
| 1 | 1 | 0.5 | 13 |
| 1 | 1 | 1.0 | 52 |
| 1 | 1 | 1.5 | 89 |
| 1 | 1 | 2.5 | 25 |

In this table the total moles of NaOH includes the caustic needed to neutralize the thioglycolic acid. It can be readily seen that even with only some of the thioglycolic acid neutralized, there is a yield of 2-hydroxy-1-naphthaleneacetic acid. It can also be seen that about 2½ moles of caustic are about the maximum usable without a very strong drop of the yield of desired product.

The starting materials in the process of our invention are the naphthols such as beta-naphthol and alpha-naphthol and naphthalenediols, and their chloro, bromo, alkyl and alkoxy derivatives which have the respective adjacent alpha and beta positions free. The mercaptoalkanoic acids are thioglycolic acid, β-mercaptopropionic acid and other α- or β-mercaptoalkanoic acids. The alkali used is preferably sodium or potassium hydroxide, although other strong inorganic hydroxides such as lithium, rubidium, caesium and the like may be used as well as quaternary ammonium hydroxides as tetramethylammonium hydroxide, which is known to be of a basic strength equivalent to that of the strong inorganic alkalies.

Although the desired products are obtainable in fair yields when no solvent is used and the naphthol, mercaptoalkanoic acid, and alkali are heated directly, it has been found that the yields are greatly improved by using a solvent. Ethylene glycol and other polyhydric alcohols such as diethyleneglycol, butylene glycol, propylene glycol, glycerine and the like are preferred solvents for this reaction although orthodichlorobenzene and other inert non-aqueous solvents can be used with less advantageous results.

In the process of our invention the reactants, either with or without solvent, are heated above 80° C.

Our invention can be illustrated by the following examples in which parts are by weight unless otherwise specified and parts by volume are to parts by weight as milliliters are to grams.

*Example 1*

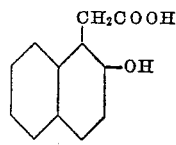

A reaction mixture consisting of 28.8 parts (0.2 mole) of 2-naphthol, 18.4 parts (0.2 mole) of thioglycolic acid and 12 parts (0.3 mole) of sodium hydroxide is heated at 80–140° C. until the reaction is essentially complete. The reaction mixture is then dissolved in 750 parts of hot water containing 60 parts of 20% sodium hydroxide solution. The solution is filtered and acidified (pH about 1) with concentrated hydrochloric acid. The crude product is then separated by filtration (31.0 parts, M.P. 105–122° C.) and is dissolved in about 600 parts of water plus about 75 parts of 20% sodium hydroxide solution. The pH of the solution is adjusted to 7–8 (just alkaline) by bubbling in gaseous carbon dioxide. The filtered solution (about 9.0 parts of 2-naphthol recovered) is acidified (pH about 1) and the product is separated by filtration.

Example 2

A reaction mixture consisting of 28.8 parts (0.2 mole) of 2-naphthol, 28 parts of ethylene glycol, 12 parts (0.3 mole) of sodium hydroxide and 18.4 parts (0.2 mole) of thioglycolic acid is heated at 145–150° C. until the reaction is essentially complete. One hundred seventy five parts of water is added and the charge is stirred at 90° C. for a short time. About 2,000 parts of water is then added and the pH of the mixture is adjusted to 7–8 (just alkaline) with hydrochloric acid. A gray precipitate is separated by filtration at 60° C. The filtrate is acidified with hydrochloric acid (pH about 1) and the product, after it is separated by filtration, washed with water, and dried. It is similar to the product of Example 1.

Examples 3–6

The procedure of Example 2 was followed with variations in the kind and amount of alkali and solvent used, as indicated in the table below. The results are shown in the table which also includes the data from Examples 1 and 2.

| Example No. | Alkali Kind | Alkali Moles | Solvent Kind | Solvent Moles | Percent Yield |
|---|---|---|---|---|---|
| 1 | NaOH | 0.3 | | | 48 |
| 3 | KOH | 0.3 | ¹A | 65 | 54 |
| 4 | NaOH | 0.1 | ¹B | 28 | 13 |
| 5 | NaOH | 0.2 | ¹B | 28 | 52 |
| 2 | NaOH | 0.3 | ¹B | 28 | 89 |
| 6 | NaOH | 0.5 | ¹B | 28 | 25 |

¹ A: o-dichlorobenzene; B: ethylene glycol.

Example 7

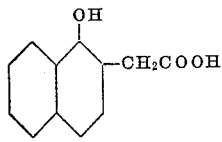

A reaction mixture consisting of 28.8 parts (0.2 mole) of 1-naphthol, 12 parts (0.3 mole) of sodium hydroxide, 28 parts of ethylene glycol and 18.4 parts (0.2 mole) of thioglycolic acid is heated at 145–155° C. until the reaction is essentially complete. A solution of the reaction mixture in 2,000 parts of water is treated with hydrochloric acid until the pH is about 7–8 (just alkaline). The solution is filtered and the filtrate is acidified (pH about 1) with concentrated hydrochloric acid. An oil is separated by decantation. The liquid remaining after decanting the oil is allowed to stand, and the crystals which form are separated by filtration. Purification of the product by crystallization from toluene gives 1-hydroxy-2-naphthaleneacetic acid.

When an equivalent amount of β-mercaptopropionic acid is used in place of the thioglycolic acid, the corresponding β-(1-hydroxy-2-naphthyl)propionic acid is obtained.

Example 8

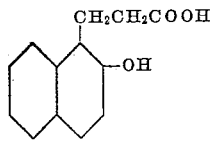

A reaction mixture consisting of 28.8 parts (0.2 mole) of 2-naphthol, 28 parts of ethylene glycol, 12 parts (0.3 mole) of sodium hydroxide and 21.2 parts (0.2 mole) of beta-mercaptopropionic acid is heated at 150–170° C. until the reaction is essentially complete. Water is then added until the charge occupies the volume of 1,000 parts of water. The solution is filtered. The pH of the solution is then adjusted to 7–8 (just alkaline to Brilliant Yellow Paper) with hydrochloric acid and any unreacted 2-naphthol is filtered off. The filterate is then made acid (pH about 1) with concentrated hydrochloric acid, the crude product is separated by filtration. The crude product can be purified by crystallization from n-butanol to give the pure compound.

Example 9

A solution of 1-hydroxy-2-naphthalene-acetic acid in dilute aqueous caustic is placed upon cellulose. The cellulose is then padded with diazotized paranitroaniline and is immediately dyed a slightly reddish-brown as the coupling is effected. If dianisidide tetrazo is used as the diazo component the cellulose is colored a deeper brown.

Example 10

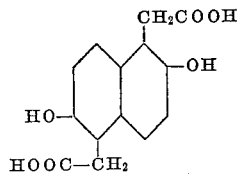

The procedure of Example 1 is followed using one-quarter of the equivalent quantity of 2,6-naphthalenediol in place of the 2-naphthol to give the product of the above formula.

Example 11

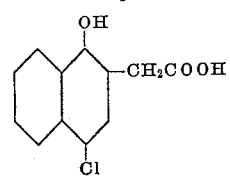

The procedure of Example 7 is followed using 4-chloro-1-naphthol in equivalent equantity in place of 1-naphthol. The product has the above formula. When the corresponding 4-bromo-1-naphthol is used the product is the 4-bromo-1-naphthol-2-acetic acid.

Example 12

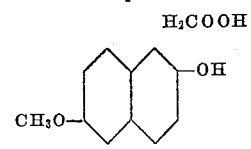

The procedure of Example 1 is followed, using 6-methoxy-2-naphthol in equivalent amount in place of 2-naphthol. Similarly, 6-ethoxy or 6-butoxy-2-naphthols give the corresponding higher alkoxy compounds.

Example 13

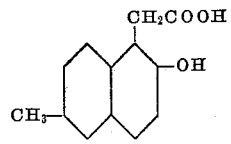

The procedure of Example 1 is followed using an equivalent amount of 6-methyl-2-naphthol in place of the 2-naphthol. When the 6-isopropyl and 6-butyl-2-naphthols are used, the product is the corresponding higher alkyl compound.

Example 14

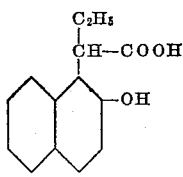

The procedure of Example 1 is followed using, in place of the thioglycolic acid, an equivalent quantity of α-mercaptobutyric acid (prepared by the reaction of α-bromobutyric acid with thiourea followed by alkaline hydrolysis of the isothiuronium intermediate). Similarly, the corresponding α-mercaptopalmitic acid, prepared in a similar fashion, gives the corresponding α-naphthylpalmitic acid.

*Example 15*

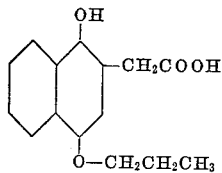

A mixture of 20.2 parts of 4-n-propoxy-1-naphthol, 9.2 parts of thioglycolic acid, 25.0 parts by volume of ethylene glycol, and 6.0 parts of NaOH pellets is stirred to 150° C. under nitrogen until the reaction is substantially complete. The mixture is diluted to 3,000 parts by volume with water. The pH is adjusted to about 8 with hydrochloric acid, and the solution is clarified. The filtrate is acidified with concentrated hydrochloric acid and the precipitated product is removed by filtration. This, when dry, is a dark red gray solid which can be recrystallized from toluene to give a pink solid of the above structure.

*Example 16*

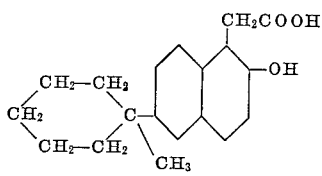

A mixture of 24.0 parts of 6-(1-methylcyclohexyl)-2-naphthol, 25 parts by volume of ethylene glycol, 6 parts of sodium hydroxide pellets, and 9.2 parts of thioglycolic acid is stirred to 150° under nitrogen until the reaction is substantially complete. The reaction mixture is diluted to 3,000 parts by volume with water. The pH is made just alkaline to Brilliant Yellow paper (about 8) and the solution is clarified. When the mixture is acidified with hydrochloric acid the product precipitates as a white solid and is removed by filtration. This can be reprecipitated from benzene by the addition of hexane, in order to purify it.

*Example 17*

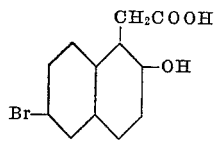

A mixture of 22.3 parts of 6-bromo-2-naphthol, 25 parts by volume of ethylene glycol, 6 parts of sodium hydroxide pellets and 9.2 parts of thioglycolic acid is stirred to 150° C. under nitrogen until the reaction is substantially complete. The reaction mixture is diluted to 2000 parts by volume with water. Sodium hydroxide (5 parts) is added and the warm solution is clarified. The pH is made just alkaline to Brilliant Yellow paper and the solution is reclarified. The mixture is acidified with hydrochloric acid. The product precipitates and is recovered by filtration.

*Example 18*

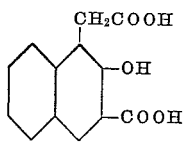

A mixture of 37.6 parts of 3-hydroxy-2-naphthoic acid, 50 parts by volume of ethylene glycol, 18.4 parts of thioglycolic acid, and 12.0 parts of sodium hydroxide pellets is stirred and heated to 120° C., when 8.0 parts additional sodium hydroxide pellets and 15 parts by volume of additional ethylene glycol is added. Hydrogen sulfide gas is evolved. The mixture is stirred at 147° C. until the reaction is substantially complete and is then diluted to 3,000 parts by volume with water. The pH is reduced to just alkaline with hydrochloric acid and the solution is clarified. The filtrate is acidified with hydrochloric acid. The precipitated product was removed by filtration and washed with water. The yellow solid is dissolved in 200 parts of absolute alcohol and repreciptated with 300 parts by volume of water. The purified product is recovered by filtration and drying. Analysis shows it is contaminated with the starting material 3-hydroxy-2-naphthoic acid. This is removed by coupling diazotized sulfanilic acid into the latter and washing out the water soluble azo dye. The impure product is dissolved in 200 ml. parts by volume of water containing enough 20% sodium hydroxide to make the pH 7. In 300 parts by volume of water is dissolved 9.5 parts of sulfanilic acid using enough 20% sodium hydroxide to make the pH 7. Sodium nitrite is added and the mixture is cooled to 5° C. with ice. Conc. hydrochloric acid is added until the pH is acid to Congo red. The diazo solution is allowed to stand a short time and is then added dropwise to the alkaline solution of the impure product. The final pH is acid. The insoluble product is filtered and washed with hot water until the insoluble product is only pink. This product is only slightly impure.

*Example 19*

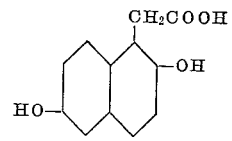

A mixture of 10 parts (0.625 mole) of 2,6-dihydroxynaphthalene, 11.5 parts (0.125 m.) of thioglycolic acid, 25 parts by volume of ethylene glycol, and 7.5 parts (0.188 m.) of sodium hydroxide pellets is stirred at 150° C. under nitrogen until the reaction is substantially complete. The reaction mixture is diluted to 500 parts by volume with water. The pH is reduced to 8 with dilute hydrochloric acid and the solution is clarified. The filtrate is acidified with hydrochloric acid and the black product is filtered off. This product is dissolved in 800 parts by volume of water containing 5 parts of sodium hydroxide. The product is reprecipitated with hydrochloric acid, and filtered.

*Example 20*

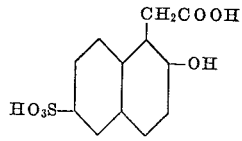

A mixture of 71.7 parts of 68.5% 2-naphthol-6-sulfonic acid sodium salt, 150 parts by volume of ethylene glycol, 18.4 parts of thioglycolic acid, and 12 parts of sodium hydroxide pellets is stirred at 150° C. under nitrogen until the reaction is substantially complete. The mixture is made just alkaline to Brilliant Yellow paper and 150 g. of salt is added. The mixture is diluted to 700 parts by volume. Salt (50 parts) is added to 350 parts by volume of this solution held at 60° C. The mixture is cooled to 15° C. The insoluble material is filtered and discarded. The filtrate is allowed to stand overnight. The further precipitate which forms is filtered and washed with saturated brine solution. A white solid is obtained.

Example 21

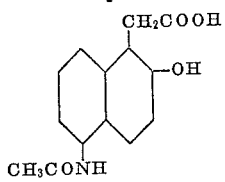

A mixture of 40.2 parts of 5-acetamino-2-naphthol, 35 parts by volume of ethylene glycol, 18.4 parts of thioglycolic acid, and 12 parts of sodium hydroxide pellets is stirred under nitrogen at 148° C. until the reaction is substantially complete. The mixture is diluted with water to 800 parts by volume and the pH is made just acid. The dark brown product is filtered. It appears to be the lactone of 2-hydroxy-5-acetamino-1-naphthalene-acetic acid.

We claim:

1. A process of producing hydroxynaphthyl alkanoic acids which comprises heating a hydroxy substituted naphthalene in which there is on the same ring with a hydroxyl an unsubstituted position, the said unsubstituted position and the said hydroxyl being adjacent alpha and beta positions, with a mercapto alkanoic acid selected from the group consisting of thioglycolic and β-mercaptopropionic acids to at least 80° under strongly alkaline, substantially anhydrous conditions and acidifying the product thus formed.

2. The process of claim 1 in which the reaction mixture includes ethylene glycol as a solvent.

3. The process of claim 2 in which the mercaptoalkanoic acid is thioglycolic acid.

4. The process of claim 3, in which the naphthol is alpha-naphthol.

5. The process of claim 3, in which the naphthol is beta-naphthol.

6. The compound, 1-hydroxy-2-naphthaleneacetic acid.

7. The compound β-(1-hydroxy-2-naphthyl)propionic acid.

8. The compound 2,6-dihydroxy 1,5-bis-carboxymethyl naphthalene.

References Cited in the file of this patent

UNITED STATES PATENTS

| | | |
|---|---|---|
| 2,141,611 | Malishev | Dec. 27, 1938 |
| 2,403,013 | Meadow | July 2, 1946 |
| 2,502,001 | Feasley | Mar. 28, 1950 |

OTHER REFERENCES

Hemmelymayr: "Chem. Abstracts," vol. 16 (1922), p. 3087.

"Beilstein," First Supplement, vol. 10 (1932), pp. 145, 149 and 150.